Figure 1:
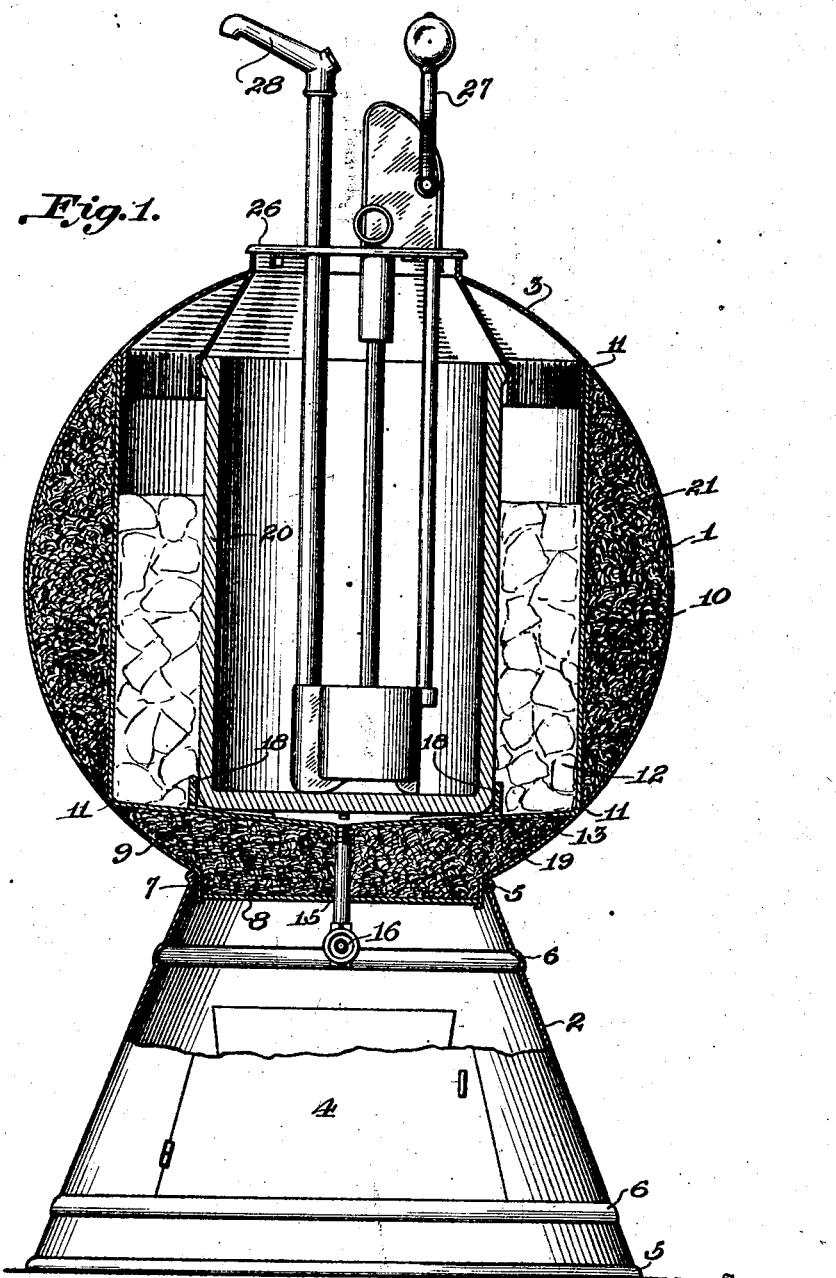

April 26, 1927.  
D. LORANT  
BEVERAGE DISPENSER  
Filed June 28, 1926  
1,626,544  
2 Sheets-Sheet 2
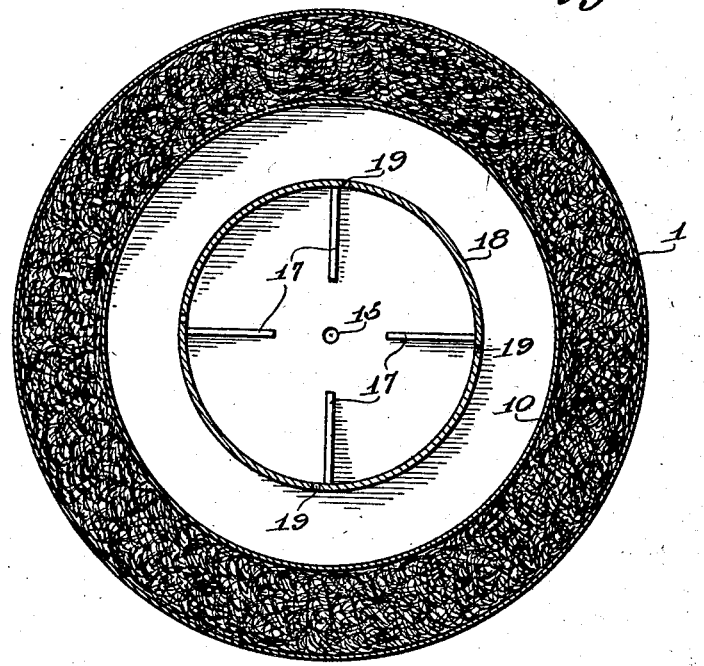
Fig. 2.
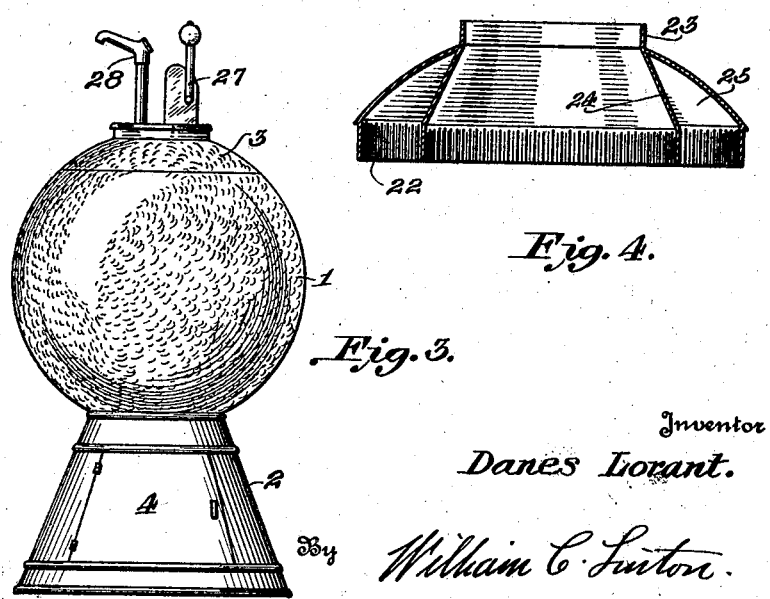
Fig. 3.
Fig. 4.
Inventor  
Danes Lorant.  
By William C. Linton.  
Attorney Patented Apr. 26, 1927.

1,626,544

UNITED STATES PATENT OFFICE.

DANES LORANT, OF SHREVEPORT, LOUISIANA.

BEVERAGE DISPENSER.

Application filed June 28, 1926. Serial No. 119,130.

The present invention relates to dispensing apparatuses and more particularly to a portable container for keeping cool orange juice and like beverages, having for an object to provide a novel form of vessel or jacket simulating an orange for holding and keeping cool a beverage containing jar and a support therefor which will have a pleasing and inviting appearance.

It is likewise an equally important object of the invention to provide a portable apparatus of this character and support therefor which when assembled will be of sufficient height to permit of the dispensing of the beverage therefrom without the aid of a supporting means or placing the same upon an ordinary counter and furthermore, one in which the various parts thereof may be readily disassembled and taken apart to permit of the ready and easy cleaning of the various parts thereof as well as permitting the same to take up but a comparatively small amount of space during transporting of the device.

Other objects of the invention will be in part obvious and in part pointed out hereinafter.

In order that the invention and its mode of operation may be readily understood by persons skilled in the art, I have in the accompanying drawings and the detailed following description based thereupon, set out one practical embodiment of the invention.

In these drawings:

Figure 1 is a vertical section through the apparatus when assembled embodying the present invention, Figure 2 is a horizontal section taken on the line 2—2 of Figure 1, Figure 3 is a front elevation of the complete assembled apparatus, and Figure 4 is a detail vertical section through the cover for the container.

Referring now more particularly to the accompanying drawings wherein corresponding parts are designated by similar reference characters throughout the several views, the container is herein indicated in its entirety by the numeral 1, which is detachable from and supported upon a base 2. The container is adapted to support and hold a suitable jar containing the beverage, such as orange juice, to be dispensed therefrom by any ordinary or preferred form of dispensing appliances. Forming part of this container 1 is a cover 3 which supports the dispensing appliance and permits ready access into the interior of the container whereby additional beverage may be placed within the container and ice or other suitable cooling medium stored about the jar.

The base 2 is preferably rolled from sheet metal into a truncated conical shaped formation as is shown having the wall thereof cut away to provide an opening whereby access may be gained to the interior thereof and which opening is adapted to be closed by means of a door 4. The upper and lower edges of this base are beaded about a wire or rod, as is indicated by the numeral 5, for reenforcing the same and circumferentially arranged ribs or beads 6 are also formed with the base for further reenforcing the same.

The container 1 is also preferably made from sheet metal spun in the shape of a sphere having a flange 7 formed with the lower end thereof which is of an exterior diameter slightly less than the interior diameter of the upper end of the base so that it may be received and supported upon such base. A disc or bottom 8 is welded or otherwise secured to this flange 7 and suitable packing material indicated by the numeral 9 is placed within the bottom of the container. A suitable cylindrical partition 10 is positioned within the container as is shown in Figure 1 and is attached to the walls thereof at the points 11 by welding or any other suitable manner. This cylindrical partition 10 forms an ice retaining chamber and whereas ice indicated by the numeral 12 is shown positioned within the chamber, it is of course to be understood that any other suitable cooling means such as coils may be placed therein through which may pass brine or other cooling fluid. A bottom 13 is also provided for this chamber, formed from sheet metal having a concave convex configuration whereby drainage may be effected toward the medial portion thereof. This bottom of the chamber 10 is provided with a threaded sleeve 14 to which may be connected a pipe 15. This pipe 15 extends through the container 1 and is adapted to project within the support 2. The lower end of this pipe is provided with a valve 16 whereby water or other liquid contained within the chamber 10 may be drawn off and flow within a suitable receptacle positioned within the base 2. When the apparatus is assembled access may be gained to this valve 16 or a suitable receptacle placed within the support 2 by opening the door 4 thereof. The bottom 13 of the ice chamber 10 is formed with a plurality of supporting ribs 17 and a vertically extending annular flange 18 having perforations 19 therein whereby the liquid contained within this chamber 10 may flow therethrough and travel down into the outlet or drain pipe 15. A suitable beverage containing jar or crock may be placed within the container 10 and supported upon the ribs 17 and by providing these ribs 17, the water from the ice contained within the chamber may flow beneath the jar 20 into the drain pipe 15. A suitable packing such as a green leaf filler or other insulating material indicated by the numeral 21 may be placed between the chamber 10 and the outer wall 1 of the container thereby providing suitable heat insulating material around the side and bottom of the ice chamber 10.

The cover 3 is also preferably made of sheet metal having a depending flange 22 which is adapted to rest within the chamber 10 in the manner as illustrated in Figure 1 and the top portion of this cover is provided with an opening which is surrounded by an annular flange 23. An annular inner wall 24 is secured at its upper end to this cover 23 and spaced from the outer wall thereof permitting an air space 25 between the inner and outer walls of the cover. The inner wall 24 of this cover is also provided with a flange which is adapted to project about the outer upper end of the jar 20.

Adapted to be seated upon the flange 23 of the cover is a glass plate or disc 26 upon which is supported a suitable dispensing air apparatus as is shown. The dispensing apparatus as herein disclosed comprises a suitable pump which is adapted to be positioned within the lower end of the jar 20 whereby upon turning the handle 27 of this pump the beverage contained within the jar may be dispensed through a suitable nozzle 28.

The apparatus when completely assembled as is better illustrated in Figure 3 of the drawing is of sufficient height whereby an attendant may stand beside the same and by turning the handle 27 of the dispensing device cause the beverage positioned within the jar 20 to be delivered through the nozzle 28. The entire apparatus may be said to consist of three principal units which are formed from sheet metal and that is, first, a base indicated in its entirety by the numeral 2; a container indicated by the numeral 1 and a top for this container indicated by the numeral 3. These separate and distinct units are placed one upon the other in the manner as shown and do not require additional fastening or attaching elements for holding the same together. The outer wall of the jacket 1 as well as the cover 3 are made of hammered and sheet metal to represent an ordinary orange and likewise the outer faces thereof may be painted the color of an orange. By providing the base, container and top therefor in three separate and distinct units they may be easily and readily handled for transporting and access may be readily gained to the interior thereof for cleaning purposes. In assembling this apparatus, the container 1 is placed upon the support 2 and a jar or crock 20 containing the suitable beverage is placed upon the ribs 17 within the flange 18 of the bottom of the container and finally ice is packed around the jar 20. It is also to be noted that the dispensing apparatus is a separate and detachable unit from the cover 3 and is only supported thereby. This double wall cover 3 provides an air pocket or space 26 above the ice container 10 and the glass plate 26 which extends over the opening within the cover, forms a support for the dispensing apparatus and permits access to be gained within the jar 20 without removing the cover 3.

Manifestly, the construction shown is capable of considerable modification and such modification as is within the scope of my claim, I consider within the spirit of my invention.

I claim:

A dispensing apparatus of the character described comprising a base, a container supported upon said base, said container comprising a sheet metal spherical jacket, a cylindrical partition arranged within said jacket and insulated therefrom, forming a cooling chamber, a bottom for said cooling chamber and insulated from said jacket, a perforated flange formed with said bottom, said bottom adapted to support a beverage containing jar, a double wall cover for said jacket having an air space therein adapted to communicate with said chamber, a dispensing device supported by said cover and adapted to extend within the jar arranged within said cooling chamber, and a drain pipe leading from the lower end of said chamber and adapted to extend within said base substantially as and for the purpose specified.

In witness whereof I have hereunto set my hand.

DANES LORANT.